June 22, 1926.
G. R. McDERMOTT
1,589,651
PRESSURE TIP SCALE FOR CUTTING BLOWPIPES
Filed July 3, 1922
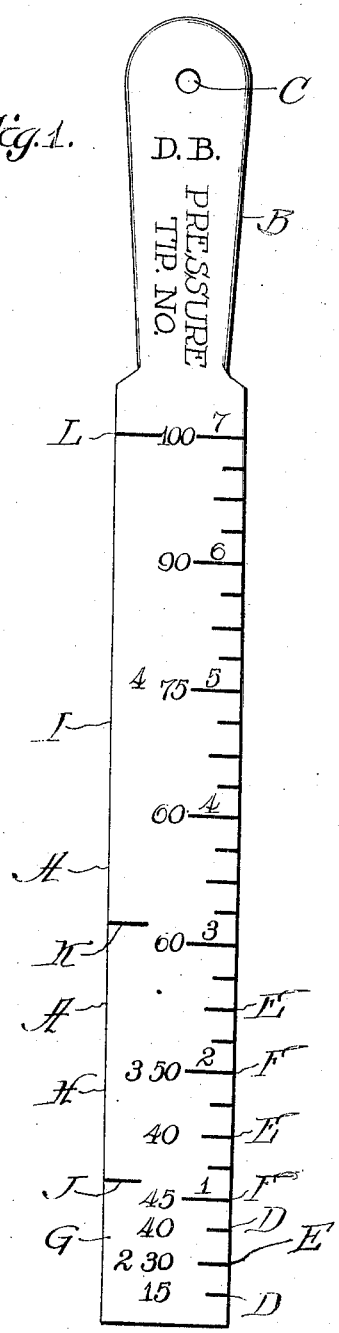
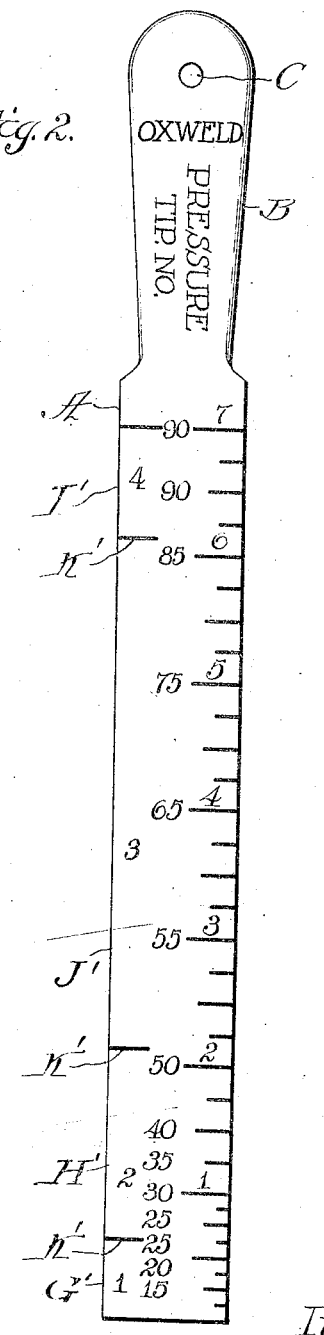

Patented June 22, 1926.

1,589,651

UNITED STATES PATENT OFFICE.

GEORGE R. McDERMOTT, OF CHICAGO, ILLINOIS.

PRESSURE-TIP SCALE FOR CUTTING BLOWPIPES.

Application filed July 3, 1922. Serial No. 572,495.

My invention has reference to a pressure-tip scale adapted for use in oxy-acetylene work and has particular reference to a scale which enables the workman to quickly and easily choose the proper tip for use in cutting a particular piece of metal or in doing a particular job.

In this general type of work there are two or three types of burners in common use with a very large majority of these burners being of the Oxweld and Davis-Bournonville types, and my invention has to do with a scale which is applicable to either of the two types of burners identified above.

Another and further object of my invention is the provision of a scale by means of which the operator can tell at a glance what particular burner to use for a particular purpose and which also indicates to the workman the proper oxygen pressure to use resulting in the proper amount of oxygen being used and avoiding unnecessary waste.

Another and further object of my invention is the provision of a scale containing three calibrations namely, a scale to determine the thickness of metal to be cut, a scale of the oxygen pressure proper for use in making such cut, and a scale giving the size and working range of the tip depending upon the thickness of the metal to be cut.

Another and further object of my invention is the provision of a device which is indestructible and which is simple and efficient in operaton and which can be easily carried from place to place with a portable cutting outfit.

These and other objects of my invention will be more fully and better understood by reference to the accompanying sheet of drawings in which—

Figure 1 is an elevational view of one side of my scale showing calibrations for a Davis-Bournonville pressure tip;

Figure 2 is an elevational view of the opposite side of the scale shown in Figure 1 having calibrations thereon for use with an Oxweld type of burner.

Referring now specifically to the drawings and particularly to Figure 1, a scale A is shown having a handle portion B with a hole C in the upper end thereof by means of which the scale can be suspended from a pin, nail, or the like. Upon the right hand side of the scale A as it appears in Figure 1 of the drawing is a series of lines D, D indicating quarter inches with other lines E, E thereon indicating half inches and with lines F, F indicating inches with suitable numerals positioned above the lines F, F to indicate the measurement in inches from the lower end of the scale. The left side of the gauge is divided into spaces G, H and I indicated by a plurality of markings J, K, and L, spaces G, H, and I having the numerals 2, 3, and 4 therein for the purpose of indicating the number of the burner to be used in cutting a piece of metal of any thickness as for instance, a number 2 burner is to be used on all pieces of metal up to one inch in thickness or very slightly in excess thereof, and between one inch and three inches a number 3 burner is the proper one for use. Intermediate the rows of calibrations of inches on one side of the scale and the spaces for the number of the burner on the opposite side of the scale is a row of numerals from 15 to 100 and representing the proper oxygen pressure for use with the various burners and indicating the proper oxygen pressure to be used for the different thicknesses of metal to be cut, the numerals representing the oxygen pressure in the one inch space being placed opposite the marks indicating one-quarter inches opposite the one-half inch mark between one inch and two inches and thereafter the rows of figures are placed only opposite the marks indicating inches.

In the drawings Figure 2 represents the opposite side of the scale shown in Figure 1 showing calibrations for use with the Oxweld type of cutting nozzle and has a series of calibrations at the right side thereof running from one to seven inches the first inch being divided into eighths and thereafter into quarters. At the opposite side of the gauge is a series of spaces G', H', J' and I' having the numerals 1, 2, 3 and 4 therein which designate the proper number of burner to use for all material of the sizes indicated falling between the lines K' separating the spaces G', H', J' and I'. Centrally located of the gauge is a vertically extending row of numerals indicating the oxygen pressure to be used with a particular burner and when cutting a piece of material having a certain thickness or width as for instance, in cutting through a three inch piece of material a number 3 burner should be used with a pressure of 55 pounds per square inch.

It will thus be seen that when the operator of the cutting apparatus has a particular job to do he measures the thickness of his material by the calibrations in inches appearing on the right side of the gauges and if he is cutting a piece of material one inch thick with a Davis-Bournonville type of head, he uses a number 2 burner with a pressure of 45 pounds per square inch of oxygen. If he is using a burner of the Oxweld type he uses a number 2 burner, but with an oxygen pressure of 30 pounds to the square inch so that simply by measuring the thickness of the piece of material the operator can determine at a glance the proper burner to use with the oxygen pressure essential to efficient operation without waste and sets his machine accordingly. The gauges are made of metal and have the calibrations marked thereon in oxidized letters so that they are indestructible and can be used for an indefinite period of time.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A gauge for use in the art of metal cutting comprising a scale having a series of graduations thereon to indicate dimensions and two series of numbers, each number of one series in relation to a single graduation or group of graduations indicating the proper size burner tip and each number of the other series in relation to a single graduation or group of graduations indicating oxygen pressure to be employed by cutting a metallic object having a thickness indicated by the graduation or one of the group of graduations associated with such particular numbers.

2. A gauge for use in the art of metal cutting comprising a scale having a series of graduations thereon to indicate dimensions and two series of numbers, each number of one series in relation to a single graduation or group of graduations indicating the proper size burner tip and each number of the other series in relation to a single graduation or group of graduations indicating oxygen pressure to be employed by cutting a metallic object having a thickness indicated by the graduation or one of the groups of graduations associated with such particular numbers, the series of graduations being upon the marginal edge of one side of the scale, the series of numbers representing oxygen pressure being centrally disposed with relation to said scale and the numbers indicating the burner tip being positioned at the marginal edge of said scale opposite the side of the scale on which the said graduations are placed.

Signed at Chicago, Illinois, this 20th day of June, 1922.

GEORGE R. McDERMOTT.